United States Patent
Chieng et al.

(10) Patent No.: US 8,249,730 B2
(45) Date of Patent: Aug. 21, 2012

(54) SYSTEMS AND METHODS FOR SHADOWING AN HDA CODEC

(75) Inventors: Daniel L. Chieng, Austin, TX (US); Douglas D. Gephardt, Dripping Springs, TX (US); Jeffrey M. Klaas, Lakeway, TX (US); Adam Zaharias, Austin, TX (US)

(73) Assignee: D2Audio Corporation, Milpitas, CA (US)

( * ) Notice: Subject to any disclaimer, the term of this patent is extended or adjusted under 35 U.S.C. 154(b) by 1016 days.

(21) Appl. No.: 12/202,360

(22) Filed: Sep. 1, 2008

(65) Prior Publication Data

US 2009/0060228 A1    Mar. 5, 2009

Related U.S. Application Data

(60) Provisional application No. 60/969,613, filed on Sep. 1, 2007.

(51) Int. Cl.
*G06F 17/00* (2006.01)
(52) U.S. Cl. .......................................... 700/94
(58) Field of Classification Search ............... 700/94
See application file for complete search history.

(56) References Cited

U.S. PATENT DOCUMENTS

| | | | |
|---|---|---|---|
| 6,012,142 A | 1/2000 | Dokic | |
| 6,016,075 A | 1/2000 | Hamo | |
| 6,205,223 B1 | 3/2001 | Rao | |
| 6,279,045 B1 | 8/2001 | Muthujumaraswathy et al. | |
| 6,301,366 B1 | 10/2001 | Malcolm et al. | |
| 6,427,181 B1 | 7/2002 | Furuhashi | |
| 6,748,515 B1 | 6/2004 | Hendrickson | |
| 6,920,553 B1 | 7/2005 | Poisner | |
| 7,425,992 B2 | 9/2008 | Feeler et al. | |
| 7,640,041 B2 | 12/2009 | Ragan | |
| 2002/0062727 A1* | 5/2002 | Poisner | 84/604 |
| 2002/0119803 A1 | 8/2002 | Bitterlich | |
| 2005/0160195 A1 | 7/2005 | Bruner et al. | |
| 2005/0278168 A1* | 12/2005 | Liu et al. | 704/221 |

(Continued)

FOREIGN PATENT DOCUMENTS

EP    1 677 574 A    7/2006

OTHER PUBLICATIONS

International Search Report and Written Opinion dated Jan. 30, 2009 for Application No. PCT/US2008/074966, 14 pages.

(Continued)

*Primary Examiner* — Davetta W Goins
*Assistant Examiner* — Daniel Sellers
(74) *Attorney, Agent, or Firm* — Fliesler Meyer LLP

(57) ABSTRACT

Systems and methods for "shadowing" a target codec to provide additional features that are not available in the target codec. In one embodiment, an audio amplification system includes a High Definition Audio (HDA) bus, and an HDA controller, a conventional HDA codec and a shadow HDA codec coupled to the HDA bus. The conventional codec receives audio data and commands from the HDA controller via the bus and processes them to generate an output audio signal. The shadow codec snoops the audio data and commands on the HDA bus that are targeted to the conventional codec. The shadow codec processes the snooped audio data and commands to generate a second audio output. The shadow codec does not communicate with the HDA controller and is transparent to the controller. The shadow codec does not request enumeration from the HDA controller and does not receive an address from the HDA controller.

23 Claims, 3 Drawing Sheets

U.S. PATENT DOCUMENTS

2006/0247811 A1  11/2006  Zaucha
2007/0005160 A1   1/2007  Zaucha
2007/0067506 A1   3/2007  Cho
2007/0239438 A1  10/2007  Chuang
2007/0255432 A1* 11/2007  Chee et al. .................... 700/94
2009/0060228 A1   3/2009  Chieng et al.

OTHER PUBLICATIONS

"High Definition Audio Specification, Revision 1.0," Intel Corporation, Apr. 15, 2004, http://download.intel.com/standards/hdaudio/pdf/HDAudio_03.pdf, pp. i-173.

"Overview of Audio Codec '97, revision 1.0," Intel Corporation, http://euc.jp/periphs/AC97_OVR.PDF, pp. 1-4.

"High Definition Audio Specification," Intel Corporation, pp. 15-19 (Apr. 15, 2004).

Office Action dated Apr. 15, 2011, for Chinese Patent Application No. 200880105207.8.

"4-Channel DAC and 6-Channel ADC High Definition Audio Codec, ALC262 Series Datasheet (Rev. 1.7)," Realtek Semiconductor Corp., Mar. 22, 2007, pp. i-64, http://www.realtek.cz/download/datsheets/alc262_v1.7.pdf.

"Low Power, Stereo CODEC w/Headphone & Speaker Amps," Cirrus Logic, Dec. 1, 2006, pp. 1-82, http://www.digchip.com/datasheets/download_datasheet.php?id=1104824&part-number=CS42L52.

International Search Report and Written Opinion dated Jan. 30, 2009 for Application No. PCT/US2008/074964, 13 pages.

International Search Report dated Nov. 25, 2008 for Application No. PCT/US2008/074963.

International Search Report dated Nov. 27, 2008 for Application No. PCT/US2008/074965.

International Search Report and Written Opinion dated Jan. 30, 2009 for Application No. PCT/US2008/074967, 14 pages.

Kennedy, R., et al., "Tailor configurable processors for audio codecs," Electronic Engineering Times-Asia, Aug. 16, 2006, pp. 1-3.

Maxim Integrated Products, "Innovative Audio Cost-Reduction and Space-Saving Solutions Tune Out the Competition," 2006, pp. 1-23, XP002503538; http://newsletter.spezial.de/pdfdata/AUDIO_9.pdf> [retrieved on Nov. 11, 2008].

Princeton Technology Corp., "Stereo 2W Class-D Amplifier With Built-In Audio Processor," Jul. 2008, pp. 1-4, XP002503539; http://www.princeton.com/tw/> [retrieved on Nov. 11, 2008].

* cited by examiner

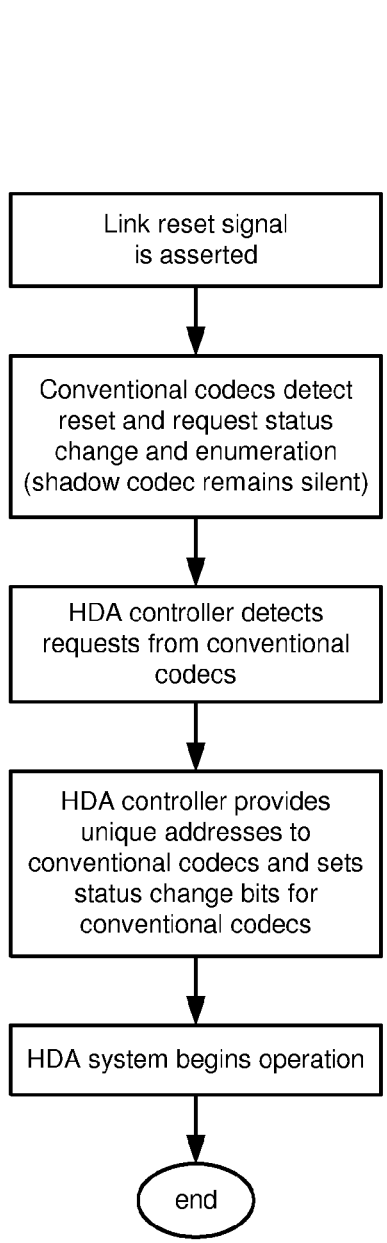
Fig. 3
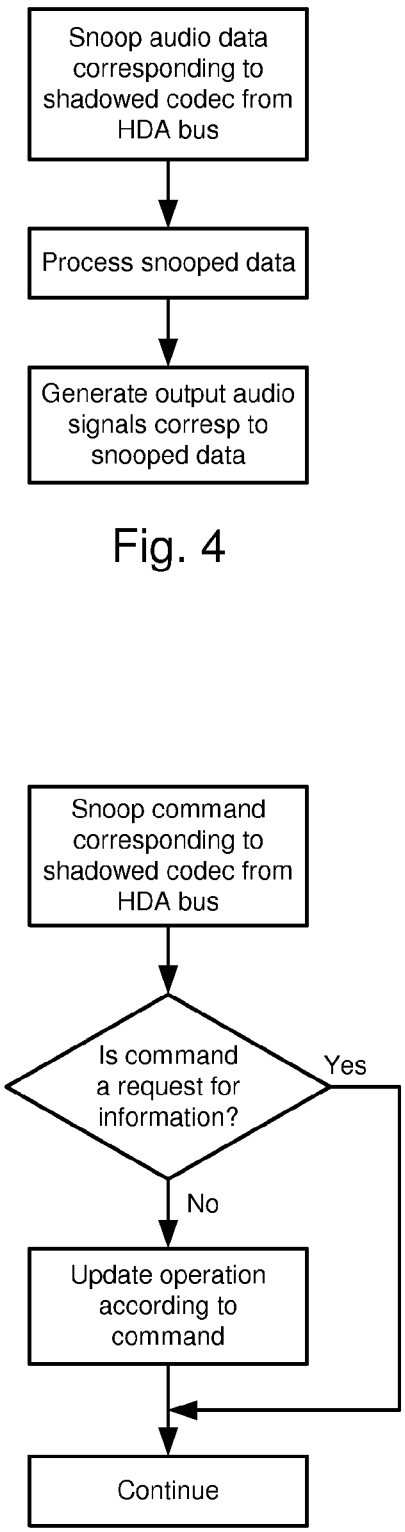
Fig. 4
Fig. 5

SYSTEMS AND METHODS FOR SHADOWING AN HDA CODEC

CROSS-REFERENCE TO RELATED APPLICATIONS

This application claims the benefit of U.S. Provisional Patent Application 60/969,613, filed Sep. 1, 2007, which is hereby incorporated by reference as if set forth herein in its entirety.

BRIEF DESCRIPTION OF THE DRAWINGS

Other objects and advantages of the invention may become apparent upon reading the following detailed description and upon reference to the accompanying drawings.

FIG. 3 is a flow diagram illustrating the non-enumeration of a shadow codec in accordance with one embodiment.

FIG. 4 is a flow diagram illustrating the snooping and processing of data in accordance with one embodiment.

FIG. 5 is a flow diagram illustrating the manner in which a shadow codec processes commands snooped from an HDA bus in accordance with one embodiment.

Figure 1:
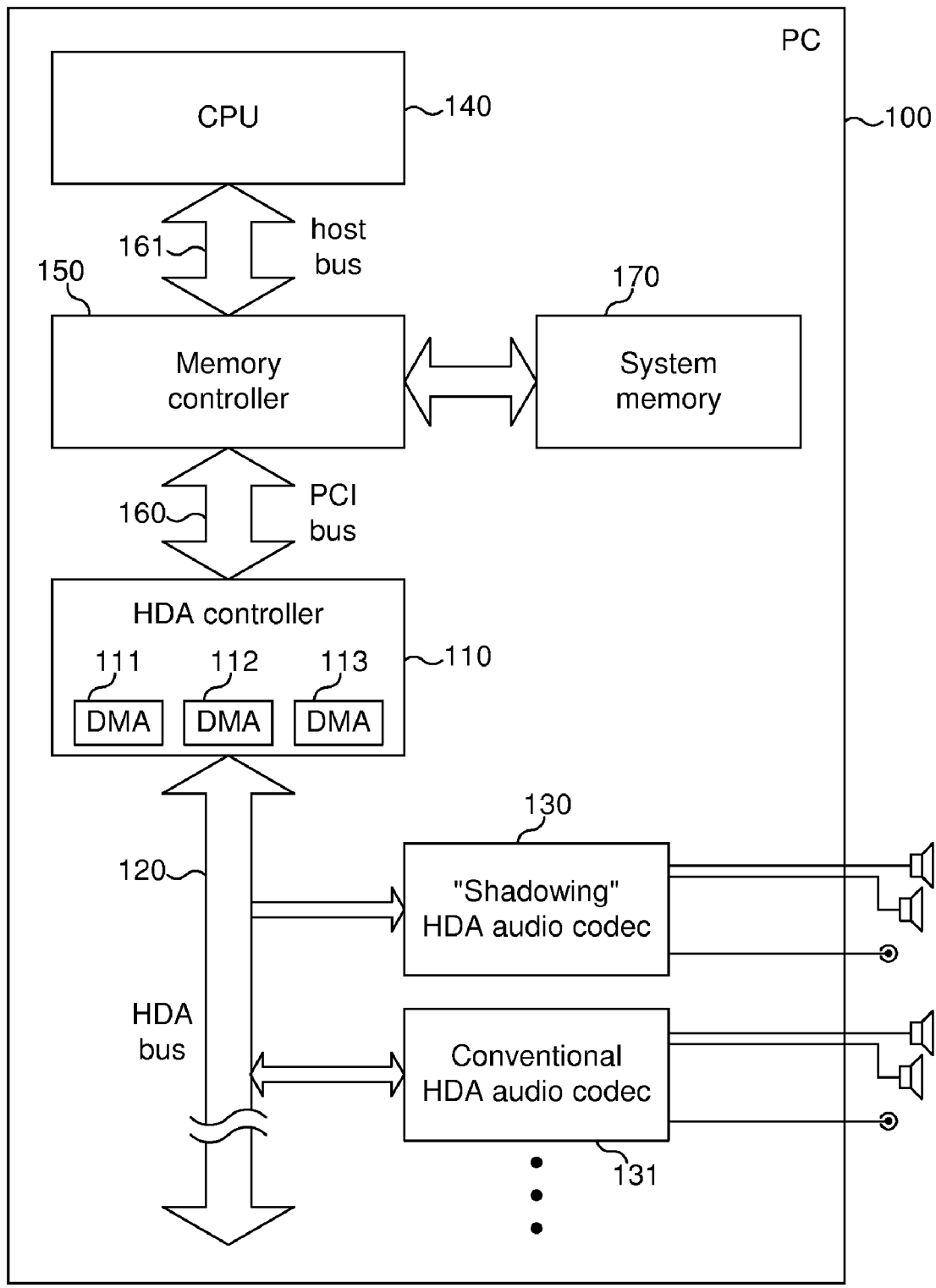
FIG. 1 is a functional block diagram illustrating the hardware structure of a system having a High Definition Audio (HDA) architecture that incorporates a shadowing codec in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods implemented in a personal computer (PC) having a High Definition Audio (HDA) system. The present systems and methods enable the "shadowing" of an HDA codec to provide additional features that are not available in codecs that are manufactured on the motherboard of a PC.

In one embodiment, an audio amplification system includes an HDA bus, and an HDA controller, a conventional HDA codec and a shadow HDA codec coupled to the HDA bus. The conventional codec receives audio data and commands from the HDA controller via the bus and processes them to generate an output audio signal. The shadow codec is configured to snoop the audio data and commands on the HDA bus that are targeted to the conventional codec. The shadow codec processes the snooped audio data and commands to generate a second audio output. The shadow codec does not communicate with the HDA controller and is transparent to the controller. The shadow codec does not request enumeration from the HDA controller and does not receive an address from the HDA controller.

The shadow codec may incorporate a programmable processor such as a DSP to perform some of the functions of the codec. For instance, in one embodiment, the DSP is configured to function as a Class-D PWM controller that can perform audio processing such as parametric equalization, psycho-acoustic effects, spatial equalization, virtual surround sound, bass boost, mixing, custom filters, etc. The programming of the DSP can be modified to change the operation of the codec or the availability of features in the codec. The shadow codec may include a look-up table that stores configuration information corresponding to multiple conventional codecs, so that when the shadow codec is installed, it can be provided with an identifier of the codec to be shadowed and can then look up the configuration information for the target codec and configure itself according to this information.

Alternative embodiments may include PC systems that incorporate this audio amplification system, as well as methods for using the system.

PC-Based Audio

Before describing exemplary embodiments of the invention, it will be helpful to review some relevant background information. With the proliferation of PCs and advances in computer technologies, there has been a demand for PCs that have an increasing number of advanced features. Customers that purchase multimedia PCs and high-end gaming PCs in particular are demanding premium audio quality in order to achieve the ultimate audio/visual experience from their PCs. This demand has been addressed to some extent by the High Definition Audio specification introduced by Intel.

When Intel's 1997 Audio Codec standard (AC'97) was introduced, PC users typically listened to music and movies that only had stereo sound. As multi-channel audio formats such as Dolby Digital and DTS became more popular, users became accustomed to these audio formats and began to expect full surround, multi-speaker sound using these formats to be available in a PC environment. While AC'97 technology was initially adequate, it has not been able to keep pace with more recent advancements (e.g., newer audio and video encoding/decoding algorithms) that enable the PC to produce higher-quality audio.

Beginning with the introduction of Intel's High Definition Audio Specification Rev 1.0 in 2004, which is incorporated herein by reference, the HDA interface has been gradually gaining popularity in the PC space. The HDA architecture defined by the Intel specification attempts to meet the need for high quality audio in the PC space. This architecture defines the delivery of high fidelity audio content from a PC's memory to one or more audio codecs using an HDA controller that performs direct memory access (DMA) transfers of audio data over an HDA bus. The audio data delivered over the HDA bus is received, processed and output by the various components of the codecs (referred to in the HDA specification as "widgets").

While the HDA specification allows quite a bit of flexibility in the design of an HDA system for a PC, this flexibility is lost when the design is implemented. For instance, while an HDA system may have multiple codecs that perform different types of processing on audio data, these codecs are hardwired and their functionality cannot be changed. It would be desirable to provide systems and methods that maintain the flexibility of the HDA system, including enabling changes to the functionality of the system after it is implemented.

This flexibility is provided in one system by providing an HDA codec that "shadows" an existing conventional codec (the target codec) and provides additional features that are not provided by the existing codec. As used herein, "shadowing" means receiving the same signals that are received by the existing codec and operating as if the signals had been intended for the shadowing codec. The shadow codec typically shadows only one conventional codec.

In one embodiment, the shadowing codec incorporates a DSP, although this is not necessary in all embodiments. The DSP is programmable so that the functionality of the shadowing codec can be modified by changing the programming of the DSP. Also, the shadowing codec can be programmed so that it can potentially shadow multiple different conventional codecs, although typically only one of the conventional codecs is selected to be shadowed when the shadowing codec is installed in the system. In one embodiment, the shadow codec incorporates a look-up table having configuration information corresponding to several different conventional codecs. The configuration information may, for example, include information identifying the nodes of the different codecs and mapping these nodes to the nodes of the shadow codec.

When the shadow codec is installed, an identifier for the codec to be shadowed is provided to the shadow codec and is used by the shadow codec to look up the corresponding configuration information. The shadow codec is then configured according to this information so that it can shadow the identified conventional codec.

High Definition Audio (HDA)

With the introduction of Intel's High Definition Audio Specification Rev 1.0 in 2004, the HDA interface has been gradually gaining popularity in the PC space. Users of multimedia PCs and high-end gaming PCs in particular are demanding premium audio quality in order to achieve the ultimate audio/visual experience from their PCs. The HDA architecture bridges the gap in delivering high fidelity audio content from the memory system of the PC to the audio codecs of the HDA system.

The primary goal of the HDA specification is to describe an infrastructure within a PC environment which is designed to support high quality audio. This infrastructure provides a mechanism for transferring audio data directly from the PC's memory system to one or more audio codecs via an HDA bus. The codecs typically convert the digital audio data received from the memory to analog signals and process these signals to output signals that can be provided as, for instance, a line output, a modem output, or an output to an amplifier.

Referring to FIG. 1, a functional block diagram illustrating the hardware structure of a system having an HDA architecture that incorporates a shadowing codec is shown. As depicted in this figure, the HDA architecture in a PC 100 includes an HDA controller 110, an HDA bus 120 and several codecs (e.g., 130-131). HDA controller 110 is coupled to the PC's memory controller 150, along with CPU 140. While FIG. 1 shows only two codecs, there may be more or fewer codecs in a given embodiment. While the conventional codec is constructed on the motherboard of the PC, it is anticipated that the shadowing codec will be removably connected to the HDA bus after manufacture of the motherboard is complete (e.g., installed in a socket connector).

HDA controller 110 is coupled to memory controller 150 via a bus (160) such as a PCI bus or other type of system bus. Memory controller 150 is coupled to CPU 140 by a host bus 161. Memory controller 150 is also coupled to the system memory 170. Codec 131 may be connected to one or more converters in order to convert the audio data processed by the codec to a suitable output format, or to convert input data received by the codec to an appropriate format for use by the codec. The audio processing of the codec is performed by a group of interconnected HDA widgets. The output signals produced by the converters may be provided to a variety of output devices such as amplifiers, speakers or headphones. Shadowing codec 130 may have a structure similar to that of conventional codec 131, but a processor-based codec provides improved flexibility in comparison to the conventional structure.

HDA controller 110 acts as a bus mastering input/output (I/O) device on the PCI bus. HDA controller 110 includes multiple DMA engines 111-113 that control the transfer of data between system memory 170 (via memory controller 150 and bus 160) and the various HDA codecs. The DMA engines can transfer data from the codecs to the system memory, as well as transferring data from the system memory to the codecs. HDA bus 120 is configured to support serial data transfers between HDA controller 110 and the codecs. HDA bus 120 is also used to distribute a 24 MHz bit line clock from the HDA controller to the codecs. This bit line clock is used by the controller and the codecs to enable the transfer of data over the HDA bus. The codecs use the bit line clock to extract time-multiplexed, serialized data from the HDA bus.

Typically, each codec will extract a corresponding stream of digital data from the time-multiplexed data on HDA bus 120. Data is transferred between the system memory and a codec in a "stream," which is defined in the HDA specification as a logical connection between a codec and a buffer in the system memory. Each stream is driven by a corresponding one of the DMA engines in the HDA controller. A stream may be either an input stream from a codec or an output stream to a codec. Output streams are considered broadcast streams, and may be received by more than one codec, while input streams are associated with only a single codec.

This digital data will be converted to an analog signal and processed by the codec. The processing may include performing a variety of functions, such as volume control, muting, mixing, and the like. As noted above, the processed data may be provided to a converter which can convert the processed signal if necessary to produce an output signal (e.g., the converter may convert the analog signal into a digital output signal). In addition to processing audio data, the codec may provide control data to HDA controller 110 via HDA bus 120. The codec may also receive input signals (e.g., an analog input signal from a microphone), process the signals, and provide these signals to the HDA controller via the HDA bus.

The shadow codec does not operate in the same manner as the typical HDA codec. Rather than processing its own stream(s) of data, the shadow codec snoops the HDA bus for data that corresponds to the shadowed codec. This data may include both audio data to be processed by the codec and commands that control various features of the codec.

Each HDA frame includes a command/response field that includes 4 bits to identify the codec that is the target of the command, and includes 8 bits to identify the node within the target codec to which the command is directed and one or more packets of data. This information is used by the shadow codec to identify which commands are directed to the shadowed codec and to which widgets within the codec the commands pertain. Each frame on the HDA bus also includes data packets, each of which includes a stream tag that identifies the stream to which the data in the packet belongs. This information is used by the shadow codec to identify the data stream to be retrieved from the bus.

Figure 2:
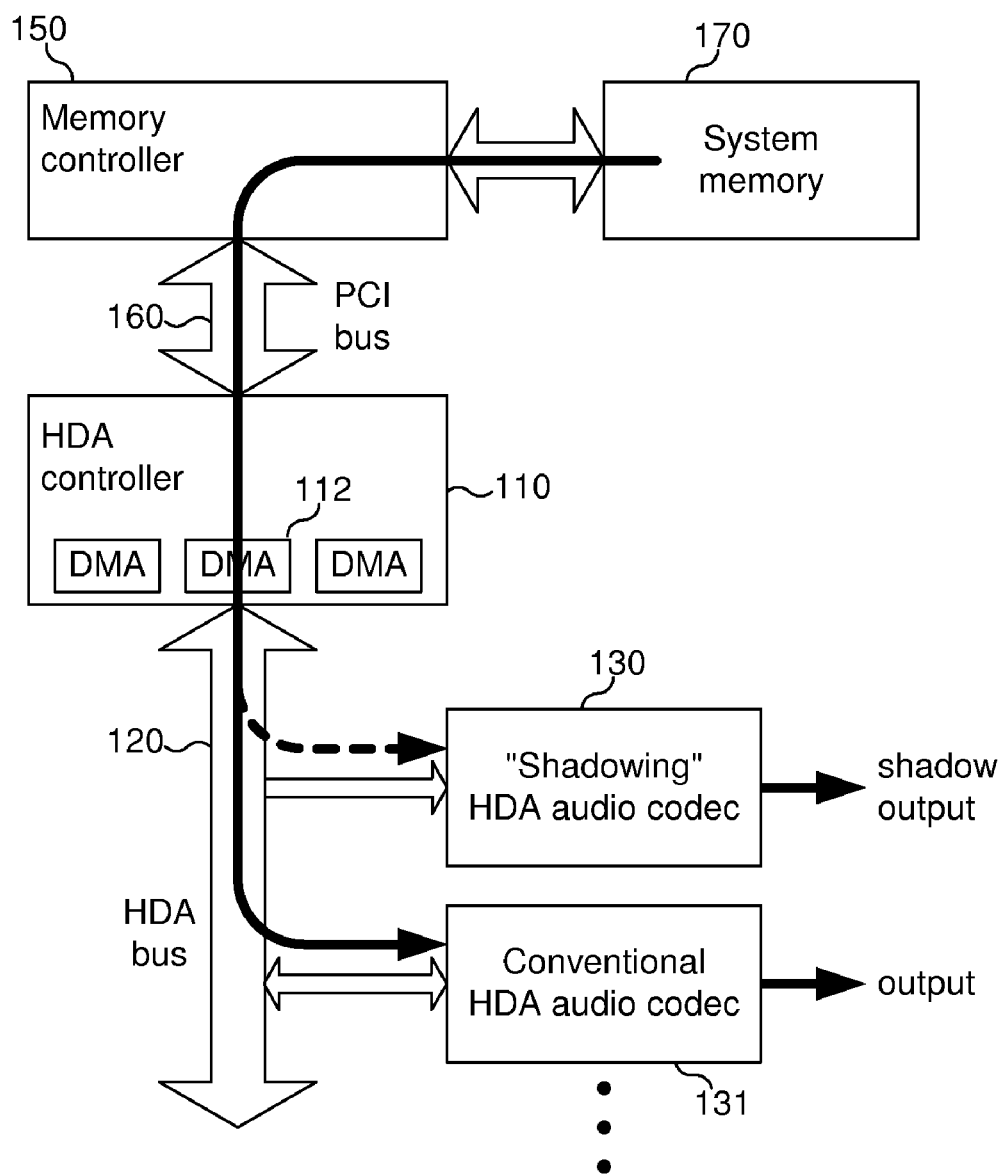
FIG. 2 is a diagram illustrating the snooping of data by a shadow codec in accordance with one embodiment.

The shadow codec retrieves the snooped data and commands from the HDA bus and processes them in parallel with the conventional codec that is being shadowed. This is illustrated in FIG. 2. The solid line extending from system memory 170 to codec 131 represents the conventional stream of data to the conventional codec, while the dotted line extending to shadow codec 130 represents the shadow codec snooping the conventional codec's data from the HDA bus.

The shadow codec does not process streams of its own and is intended to be transparent to the HDA controller and the remainder of the HDA system. As shown in FIG. 3, when the HDA system is reset, the shadow codec does not request a status change or enumeration. Consequently, the HDA controller is not aware of the shadow codec's presence and does not assign an address to the shadow codec or identify a corresponding status change.

The fact that the shadow codec is not enumerated by the HDA controller does not affect its function. The shadow codec snoops the shadowed codec's data stream and commands and processes the snooped information, updating its operation according to received commands. The shadow codec, however, does not respond to information requests from the HDA controller or otherwise affect the remainder of the HDA system. Both conventional codec 131 and shadow codec 130 produce output signals corresponding to the received audio data. The shadow codec's output will typically differ from that of the conventional codec because the shadow codec provides different features and/or functions than the conventional codec. The operation of the shadow codec is illustrated in the flow diagrams of FIGS. 4 and 5.

It should be noted that the terms "PC" and "personal computer" are used herein to refer to a wide range of computing systems that are commonly purchased and used by individual consumers. These systems may include desktop computers, laptop computers, tablet computers and the like, and may be used in home, office, mobile or other environments. It should also be noted that, although the embodiments described above focus on codecs that incorporate DSP's, other embodiments may use types of processors other than DSP's (such as general purpose programmable processors, programmable microcontrollers, etc.) to achieve the programmability, configurability and other advantages that are obtained through the use of a processor in the HDA codec.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. An audio amplification system comprising:
   a High Definition Audio (HDA) bus;
   an HDA controller coupled to the HDA bus;
   a first HDA codec coupled to the HDA bus; and
   a shadow HDA codec coupled to the HDA bus;
   wherein the HDA controller is configured to convey audio data and commands to the first HDA codec, and wherein the first HDA codec is configured to process the audio data and commands and generate a first audio output therefrom; and
   wherein the shadow HDA codec is configured to snoop the audio data and commands conveyed to the first HDA codec over the HDA bus, and to process the audio data and commands and generate a second audio output therefrom;
   wherein the HDA controller is not aware of the shadow HDA codec; and
   wherein the shadow HDA codec does not communicate with the HDA controller.

2. The audio amplification system of claim 1, wherein the HDA bus, HDA controller and first HDA codec are constructed on the motherboard of a personal computer (PC) and the shadow HDA codec is removably attached to the motherboard.

3. The audio amplification system of claim 1, wherein the shadow HDA codec incorporates a programmable processor and wherein the operation of the shadow HDA codec is modifiable by modification of program instructions that execute on the programmable processor.

4. The audio amplification system of claim 3, wherein the shadow HDA codec incorporates a look-up table that stores configuration information corresponding to multiple conventional HDA codecs, and wherein the shadow HDA codec is configured to receive an identifier for the first HDA codec, look up the identifier in the look-up table, and configure the shadow HDA codec according to configuration information in the look-up table that is associated with the identifier.

5. The audio amplification system of claim 1,
   wherein the shadow HDA codec is configured to provide one or more features and/or functions that the first HDA codec does not provide; and
   wherein the second audio output differs from the first audio output due to the shadow HDA codec providing the one or more features and/or functions that the first HDA codec does not provide.

6. An audio amplification system comprising:
   a High Definition Audio (HDA) bus;
   an HDA controller coupled to the HDA bus;
   a first HDA codec coupled to the HDA bus; and
   a shadow HDA codec coupled to the HDA bus;
   wherein the HDA controller is configured to convey audio data and commands to the first HDA codec, and wherein the first HDA codec is configured to process the audio data and commands and generate a first audio output therefrom;
   wherein the shadow HDA codec is configured to snoop the audio data and commands conveyed to the first HDA codec from the HDA bus, and to process the audio data and commands and generate a second audio output therefrom; and
   wherein the first HDA codec is configured to request enumeration from the HDA controller in response to assertion of a reset signal, and the shadow codec is configured to not request enumeration from the HDA controller in response to assertion of the reset signal.

7. The audio amplification system of claim 6, wherein the HDA controller is configured to provide a unique address to the first HDA codec and to not provide a unique address to the shadow HDA codec.

8. An audio amplification system comprising:
   a High Definition Audio (HDA) bus;
   an HDA controller coupled to the HDA bus;

a first HDA codec coupled to the HDA bus; and
a shadow HDA codec coupled to the HDA bus;
wherein the HDA controller is configured to convey audio data and commands to the first HDA codec, and wherein the first HDA codec is configured to process the audio data and commands and generate a first audio output therefrom;
wherein the shadow HDA codec is configured to snoop the audio data and commands conveyed to the first HDA codec from the HDA bus, and to process the audio data and commands and generate a second audio output therefrom; and
wherein the shadow codec is configured to not respond to commands to the first HDA codec that request information from the first HDA codec.

9. A device comprising:
a shadow High Definition Audio (HDA) codec;
wherein the shadow HDA codec is configured to be coupled to an HDA bus;
wherein the shadow HDA codec is configured to snoop audio data and commands conveyed by an HDA controller to a target HDA codec over the HDA bus, and to process the audio data and commands and generate a shadow audio output therefrom;
wherein the HDA controller, which conveys the audio data and commands to the target HDA codec over the HDA bus, is not aware of the shadow HDA codec; and
wherein the shadow HDA codec does not communicate with the HDA controller.

10. The device of claim 9, wherein the shadow HDA codec is removably attached to a motherboard of a personal computer (PC).

11. The device of claim 9, wherein the shadow HDA codec incorporates a programmable processor and wherein the operation of the shadow HDA codec is modifiable by modification of program instructions that execute on the programmable processor.

12. The device of claim 11, wherein the shadow HDA codec incorporates a look-up table that stores configuration information corresponding to multiple conventional HDA codecs, and wherein the shadow HDA codec is configured to receive an identifier for the first HDA codec, look up the identifier in the look-up table, and configure the shadow HDA codec according to configuration information in the look-up table that is associated with the identifier.

13. The device of claim 9,
wherein the shadow HDA codec is configured to provide one or more features and/or functions that the target HDA codec does not provide; and
wherein the shadow audio output differs from an audio output generated by the target HDA codec due to the shadow HDA codec providing the one or more features and/or functions that the target HDA codec does not provide.

14. A device comprising:
a shadow High Definition Audio (HDA) codec;
wherein the shadow HDA codec is configured to be coupled to an HDA bus;
wherein the shadow HDA codec is configured to snoop audio data and commands conveyed to a target HDA codec over the HDA bus, and to process the audio data and commands and generate a shadow audio output therefrom; and
wherein the shadow codec is configured to not request enumeration from an HDA controller in response to assertion of an HDA reset signal.

15. A device comprising:
a shadow High Definition Audio (HDA) codec;
wherein the shadow HDA codec is configured to be coupled to an HDA bus;
wherein the shadow HDA codec is configured to snoop audio data and commands conveyed to a target HDA codec over the HDA bus, and to process the audio data and commands and generate a shadow audio output therefrom; and
wherein the shadow codec is configured to not place any data on the HDA bus.

16. A device comprising:
a shadow High Definition Audio (HDA) codec;
wherein the shadow HDA codec is configured to be coupled to an HDA bus;
wherein the shadow HDA codec is configured to snoop audio data and commands conveyed to a target HDA codec over the HDA bus, and to process the audio data and commands and generate a shadow audio output therefrom; and
wherein the shadow codec is configured to not respond to commands to the target HDA codec that request information from the target HDA codec.

17. A method implemented in an audio amplification system comprising:
communicating data and commands from a High Definition Audio (HDA) controller to a target HDA codec over an HDA bus;
a shadow HDA codec snooping the data and commands communicated to the target HDA codec over the HDA bus;
the target HDA codec processing the audio data and commands to generate a first audio output;
the shadow HDA codec processing the snooped audio data and commands to generate a second audio output;
the HDA controller not being aware of the shadow HDA codec; and
the shadow HDA codec not communicating with the HDA controller.

18. The method of claim 17, wherein the shadow HDA codec incorporates a programmable processor, the method further comprising modifying program instructions that execute on the programmable processor.

19. The method of claim 17, further comprising first installing the shadow HDA codec, including the steps of providing the shadow codec with an identifier of the target codec, looking up the identifier in a look-up table that stores configuration information corresponding to multiple conventional HDA codecs, and configuring the shadow HDA codec according to configuration information in the look-up table that is associated with the identifier.

20. The method of claim 17,
wherein the shadow HDA codec provides one or more features and/or functions that the target HDA codec does not provide; and
wherein the second audio output differs from the first audio output due to the shadow HDA codec providing the one or more features and/or functions that the first HDA codec does not provide.

21. A method implemented in an audio amplification system comprising:
communicating data and commands from a High Definition Audio (HDA) controller to a target HDA codec over an HDA bus;
a shadow HDA codec snooping the data and commands communicated to the target HDA codec over the HDA bus;

the target HDA codec processing the audio data and commands to generate a first audio output; and the shadow HDA codec processing the snooped audio data and commands to generate a second audio output;

the HDA controller asserting a reset signal;

the target HDA codec requesting enumeration from the HDA controller in response to the reset signal; and the shadow HDA codec not requesting enumeration from the HDA controller in response the reset signal.

22. The method of claim 21, further comprising the HDA controller providing a unique address to the target HDA codec but not to the shadow HDA codec.

23. A method implemented in an audio amplification system comprising:

communicating data and commands from a High Definition Audio (HDA) controller to a target HDA codec over an HDA bus;

a shadow HDA codec snooping the data and commands communicated to the target HDA codec over the HDA bus;

the target HDA codec processing the audio data and commands to generate a first audio output; and the shadow HDA codec processing the snooped audio data and commands to generate a second audio output;

the shadow codec taking no action in response to commands to the target HDA codec that request information from the target HDA codec.

\* \* \* \* \*

UNITED STATES PATENT AND TRADEMARK OFFICE
CERTIFICATE OF CORRECTION

| | |
|---|---|
| PATENT NO. | : 8,249,730 B2 |
| APPLICATION NO. | : 12/202360 |
| DATED | : August 21, 2012 |
| INVENTOR(S) | : D. Chieng et al. |

It is certified that error appears in the above-identified patent and that said Letters Patent is hereby corrected as shown below:

At column 9, line 9, claim 21, please change "the reset signal." to -- to the reset signal. --

Signed and Sealed this
Thirteenth Day of November, 2012

David J. Kappos
*Director of the United States Patent and Trademark Office*